(12) United States Patent
Uematsu et al.

(10) Patent No.: US 8,099,862 B2
(45) Date of Patent: Jan. 24, 2012

(54) APPARATUS FOR DETACHING A HEAD SLIDER JOINED TO A MOUNTING PLATE OF SUSPENSION

(75) Inventors: Yoshio Uematsu, Kanagawa (JP); Kenjirou Watanabe, Kanagawa (JP); Takuya Satoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 667 days.

(21) Appl. No.: 12/285,000

(22) Filed: Sep. 25, 2008

(65) Prior Publication Data

US 2009/0077792 A1 Mar. 26, 2009

(30) Foreign Application Priority Data

Sep. 25, 2007 (JP) ................................ 2007-247556

(51) Int. Cl.
*B23P 19/04* (2006.01)
*G11B 5/50* (2006.01)

(52) U.S. Cl. ........... 29/762; 29/759; 29/764; 29/603.02; 228/212; 228/264

(58) Field of Classification Search ............... 29/603.02, 29/603.03, 737, 759, 743, 762, 764; 228/212, 228/264

See application file for complete search history.

(56) References Cited

U.S. PATENT DOCUMENTS

| | | | |
|---|---|---|---|
| 6,397,455 B1 | 6/2002 | Hagen | |
| 6,459,260 B1 | 10/2002 | Bonin et al. | |
| 6,571,462 B1 * | 6/2003 | Mimura et al. | 29/743 |
| 2006/0037188 A1 * | 2/2006 | Fukaya et al. | 29/603.3 X |
| 2006/0236527 A1 | 10/2006 | Davis et al. | |

FOREIGN PATENT DOCUMENTS

| | | | |
|---|---|---|---|
| JP | 2004-227675 | | 8/2004 |
| JP | 2008004226 A | * | 1/2008 |

* cited by examiner

*Primary Examiner* — A. Dexter Tugbang
(74) *Attorney, Agent, or Firm* — Zilka-Kotab, PC

(57) ABSTRACT

An apparatus for detaching a head slider bonded onto a mounting plate of a suspension includes a platform on which a head gimbal assembly is mounted; a heating device for heating a joint section between the head slider and the suspension to decrease the bonding force; a latching part for latching the mounting plate at a position on a center line of the mounting plate in the lengthwise direction and/or at positions symmetric about the center line; and a clamp device for moving the head slider in a direction along the center line with the heating to detach the head slider from the mounting plate.

8 Claims, 7 Drawing Sheets

(a)

(b)

APPARATUS FOR DETACHING A HEAD SLIDER JOINED TO A MOUNTING PLATE OF SUSPENSION

CROSS-REFERENCE TO RELATED APPLICATION

The instant nonprovisional patent application claims priority to Japanese Patent Application No. 2007-247556 filed Sep. 25, 2007 and which is incorporated by reference in its entirety herein for all purposes.

BACKGROUND OF THE INVENTION

Disk drive devices using various kinds of media, such as optical disks, magneto-optical disks, flexible magnetic disks, and the like have been known in the art. In particular, hard disk drives (HDDs) have been widely used as storage devices of computers and have been one of the indispensable storage devices for current computer systems. Moreover, the HDDs have found widespread application to moving image recording/reproducing apparatuses, car navigation systems, cellular phones, and the like, in addition to the computers, due to their outstanding characteristics.

A HDD comprises a magnetic disk for storing data and a head slider for accessing (reading or writing) the magnetic disk. The head slider comprises a head element portion to retrieve and/or write data from and/or to the magnetic disk and a slider on which the head element portion is formed. The head element portion comprises a recording element for converting electric signals to magnetic field in accordance with recording data to the magnetic disk and/or a reproducing element for converting magnetic field from the magnetic disk into electric signals.

A HDD further comprises an actuator for moving the head slider to a desired position above the magnetic disk. The actuator is driven by a voice coil motor (VCM) and pivots about a pivotal shaft to move the head slider above the spinning magnetic disk in its radial direction. This enables the head element portion to access the desired track formed on the magnetic disk to retrieve and write data.

The actuator has a suspension having elasticity and the head slider is bonded to the suspension with adhesive. The pressure caused by air viscosity between an air bearing surface (ABS) of the head facing the magnetic disk and the spinning magnetic disk balances the pressure applied by the suspension toward the magnetic disk to allow the head to fly over the magnetic disk with a specific gap.

In manufacturing a HGA, a test called a dynamic electric test (DET) is conducted. The DET sets an HGA to a test apparatus and carries out actual read/write operation from/to a spinning magnetic disk to evaluate a flying characteristic and a recording and reproducing characteristic on a head slider. A HGA with satisfactory specification in the DET proceeds to a next manufacturing step and a rejected HGA is discarded. Therefore, if a head slider does not satisfy the specification, the suspension with the head slider bonded thereto is discarded together, which has been a loss in manufacturing a HGA.

To avoid such a loss of suspension in manufacturing a HGA, an approach has been proposed that detaches a head slider from a suspension to reuse the suspension (for example, refer to Japanese Patent Publication No. 2004-227675 "Patent Document 1"). This approach of detaching a defect head slider from a suspension and reusing the suspension can prevent a loss of suspension due to defect of a head slider.

A suspension comprises a flexible gimbal for supporting a head slider on its surface facing a magnetic disk and a load beam for supporting the gimbal on its surface facing the magnetic disk. Typically, the head slider is connected to connection terminals for signal transmission on a tongue of the gimbal (flexure) with metal and securely bonded to the mounting surface of the tongue with adhesive. Therefore, when the head slider is torn off from the tongue, it is important to prevent deformation of the gimbal. A suspension with a deformed gimbal cannot be reused.

The method disclosed in the above-described document cuts or heats to melt the joint section of the head slider and the tongue, raises the head slider while holding the tongue with a stick-like flexure presser from the head slider side, and detaches the head slider. However, since the tongue and the gimbal are very flexible members, it is important to apply force onto the tongue so as not to deform the tongue and the gimbal.

The method in the above document has some problems in preventing deformation of the gimbal. Since the tongue is supported by a projecting dimple of the load beam, it is difficult to apply pressing force uniformly from the head slider side so as not to deform the gimbal. Moreover, the tongue has a risk to be deformed in raising the head slider vertically from the principal surface of the tongue. Consequently, a technique is required that can detach the head slider from the suspension suppressing deformation of the gimbal to a minimum extent.

BRIEF SUMMARY OF THE INVENTION

Embodiments of the present invention help to prevent deformation of a gimbal in detaching a head slider from a suspension. In the embodiment of FIGS. 5(a) and 5(b), after a head slider has been mounted on a suspension, a test on the assembly is conducted. If a defect head slider is found in the test, the head slider is detached from the suspension. The head slider is discarded but the suspension is reused and a new head slider is mounted on the suspension. In detaching the head slider, a pin 303 inserted in a through-hole 222 on the center line C of a gimbal tongue latches the gimbal tongue 221.

DETAILED DESCRIPTION OF THE INVENTION

Figure 1:
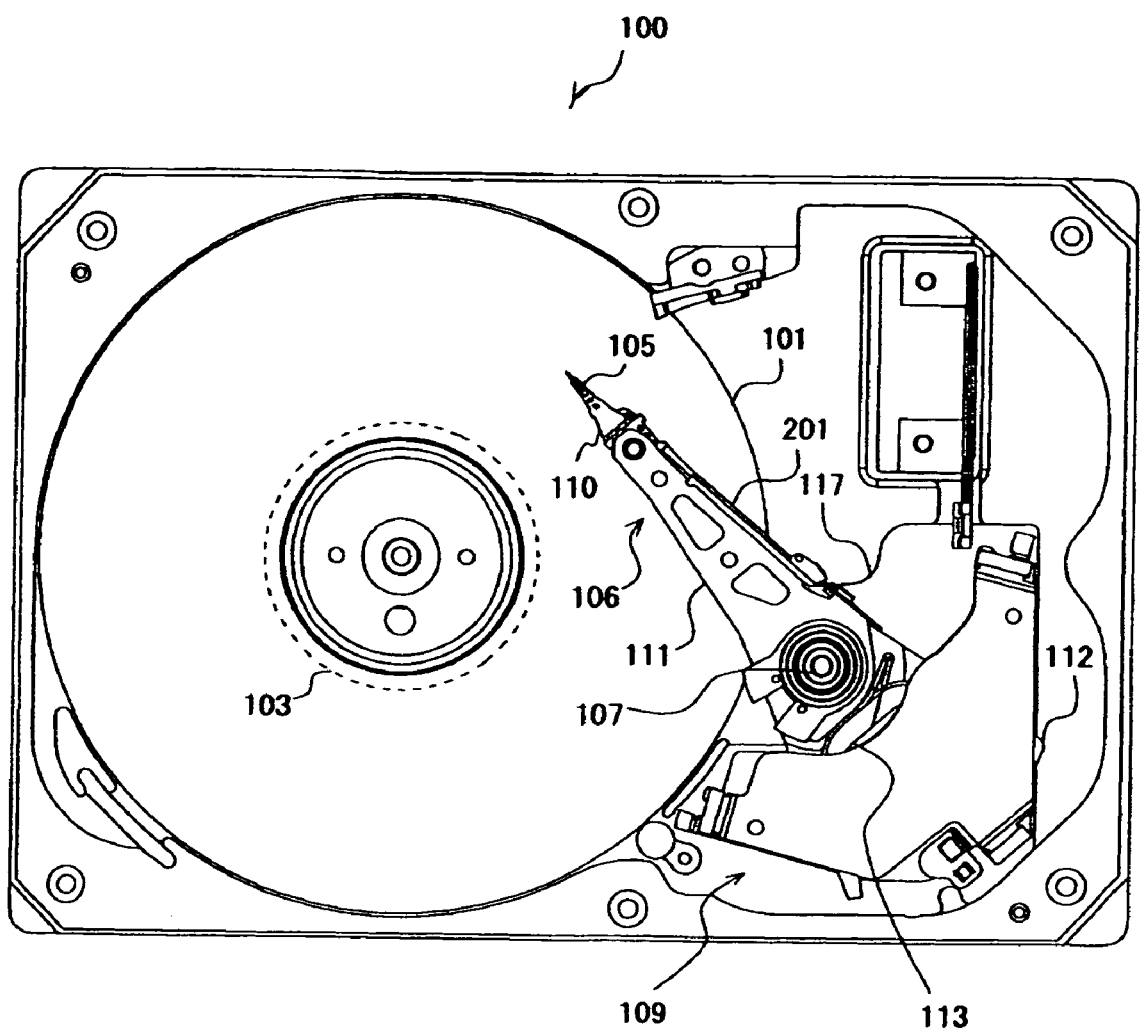
FIG. 1 is a top view depicting an entire configuration of an HDD according to one embodiment.

Embodiments of the present invention relate to a method for manufacturing a head gimbal assembly and an apparatus for detaching a head slider joined to a mounting plate of a suspension, more particularly to detachment of a defect head slider from a suspension.

A method for manufacturing a head gimbal assembly according to an aspect of embodiments of the present invention mounts a head gimbal assembly including a suspension and a head slider bonded onto a mounting plate of the suspension on a platform. It heats a joint section between the head slider and the suspension to decrease its bonding force. It moves the head slider in a direction along a center line of the mounting plate in the lengthwise direction with the heating while latching the mounting plate at a position on the center line and/or at positions symmetric about the center line, to detach the head slider from the mounting plate. It remounts another head slider onto the suspension from which the head slider was detached. Detaching the head slider in the above-described manner effectively prevents deformation of the gimbal in detaching the head slider.

In one example, the method heats the joint section with the head slider receiving force in the direction along the center line to move the head slider in the direction along the center line, and further moves the head slider in the direction along the center line to detach the head slider from the mounting plate after the heating. This achieves reduction in the heating time for decreasing the bonding force and more reliable release of the joint section between the head slider and the suspension.

Movement of the head slider along the center line may start with the mounting plate latched. This achieves movement and detachment of the head slider in the way of setting.

In one example, the head slider has an end surface on which connection terminals for signals are provided, the mounting plate is latched by a pin inserted into a through-hole formed on an opposite side of the mounting plate from the end surface, the head slider is moved in a direction toward the pin to detach the head slider from the mounting plate, and the head slider is detached from the mounting plate without the head slider touching the pin by virtue of the distance between the pin and the opposite surface from the end surface. Avoiding the touch between the pin and the head slider prevents damage of the pin. In addition, the mounting plate may be latched only by a pin inserted into a through-hole formed on the center line of the mounting plate. This achieves less influence to the structure of the apparatus for detachment which will be complicated and the design of the suspension. An outer circumferential surface of the pin may be a tapered surface, and movement of the head slider may be started with the outer circumferential surface touching an inner circumference of the through-hole. This achieves movement and detachment of the head slider in the way of setting.

In one example, the suspension has projecting parts on the both sides of the mounting plate, and the mounting plate is latched by the projecting parts. This prevents contact between the head slider and the components for latching. Each of the projected parts may be sandwiched by a pin having two arms to be latched, one of the arms of each of the pins sandwiching the projecting part has a tapered surface, and the moving the head slider is started with each of the projecting parts touching the corresponding two arms. This achieves movement and detachment of the head slider in the way of setting.

Another aspect of embodiments of the present invention is an apparatus for detaching a head slider bonded onto a mounting plate of a suspension. The apparatus comprises a platform on which a head gimbal assembly is mounted, a heating device for heating a joint section between the head slider and the suspension to decrease the bonding force, a latching part for latching the mounting plate at a position on a center line of the mounting plate in the lengthwise direction and/or at positions symmetric about the center line, and a clamp device for moving the head slider in a direction along the center line with the heating to detach the head slider from the mounting plate. This configuration can effectively prevent deformation of the gimbal in detaching the head slider.

Embodiments of the present invention accomplish detachment of a head slider from a suspension with suppressing deformation of a gimbal.

Hereinafter, embodiments to which the present invention is applicable will be described. Throughout the drawings, like components are denoted by like reference numerals and repetitive description is omitted if not necessary for clarity of explanation. In one embodiment, detailed descriptions will be given to a hard disk drive (HDD) as an example of a disk drive device. The embodiments feature detachment of a head slider from a suspension. In one embodiment, a test on the assembly is conducted after mounting a head slider on a suspension. In the present specification, the assembly of a suspension and a head slider is called a head gimbal assembly (HGA).

In the test stated above, if defect is found on a head slider, the head slider is detached from a suspension. Although the head slider is discarded, the suspension is reused and a new head slider is mounted on the suspension. This prevents waste of suspensions to improve the yield in manufacturing HGAs.

The HGA constitutes an actuator together with other components and is mounted on an HDD. As shown in FIG. 1, a spindle motor 103 spins a magnetic disk 101 in an HDD 100. An actuator 106 is pivotably supported by a pivotal shaft 107 and is driven by a voice coil motor (VCM) 109 as a driving mechanism. The actuator 106 comprises components of a suspension 110, an arm 111, a coil support 112, and a flat coil 113 joined in its longitudinal direction in order from the tip end where a head slider 105 is placed. The structure of the suspension 110 will be described in detail later.

The VCM 109 pivots the actuator 106 in its transverse direction about the pivotal shaft 107 in accordance with driving signals transmitted across the flat coil 113 from a controller (not shown). Thereby, the actuator 106 moves the head slider 105 to above the magnetic disk 101 or away from the magnetic disk 101. The pivot of the actuator 106 causes the head slider 105 to move along the radial direction of the surface of the magnetic disk 101, so that the head slider 105 can access (read or write) a desired track. Signals between the head slider 105 and the controller are transmitted through transmission wirings of a trace 201 and an FPC 117.

A head slider 105 becomes a subject to a dynamic electric test (DET) before mounted on an HDD 100 in manufacturing the HDD. In the DET, the head slider 105 is mounted on a suspension 110 to constitute an HGA, the HGA is set to a test apparatus, and actual read/write operations are performed above a spinning magnetic disk. Thereby, the flying characteristic and recording and reproducing characteristic of the head slider 105 are evaluated.

Figure 2:
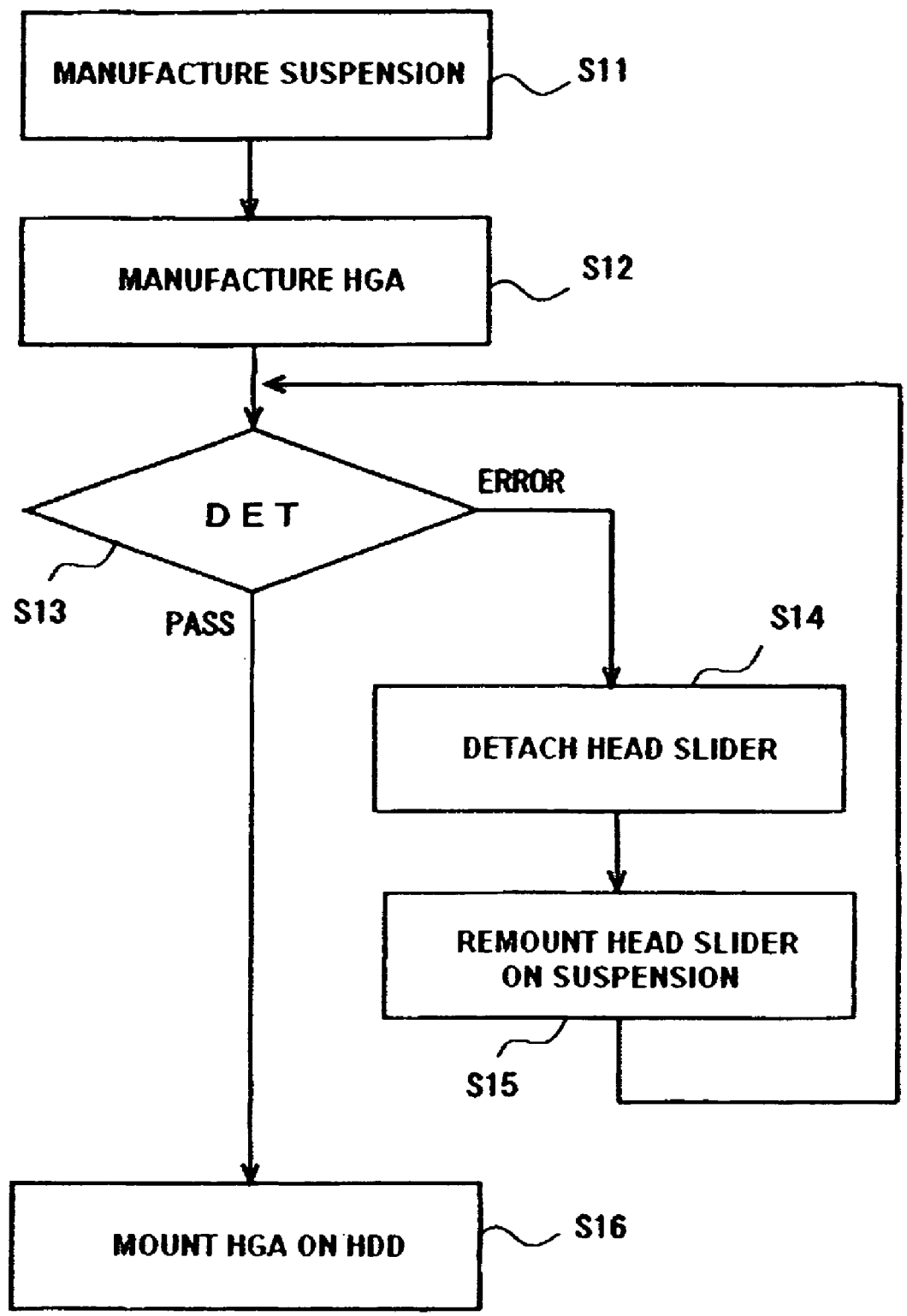
FIG. 2 is a flowchart illustrating a manufacturing steps of an HGA in one embodiment.

Specifically, as illustrated in the flowchart of FIG. 2, a suspension 110 is first manufactured (S11). Then, a head slider 105 is mounted on the prepared suspension 110 to form an HGA (S12). This assembled HGA is set to a test apparatus for the DET and the DET is conducted (S13). If the evaluation result in the DET in step S13 is 'ERROR', the head slider 105 is detached from the suspension 110 and is discarded (S14). The suspension 110 is reused and another new head slider 105 is mounted on the suspension 110 (S15), the DET is conducted again (S13).

If the evaluation result in the DET in step S13 is PASS, the HGA is mounted on an HDD 100 as a product (S16). The HGA is assembled together with an arm 111 and a VCM coil 113 to constitute a head stack assembly (HSA) altogether. Components such as the HSA, a magnetic disk 101, a spindle motor 103, and the like are mounted in a base and a top cover is secured so as to cover an opening of the base. Then, a control circuit board is mounted and the HDD 100 is finished.

Figure 3:
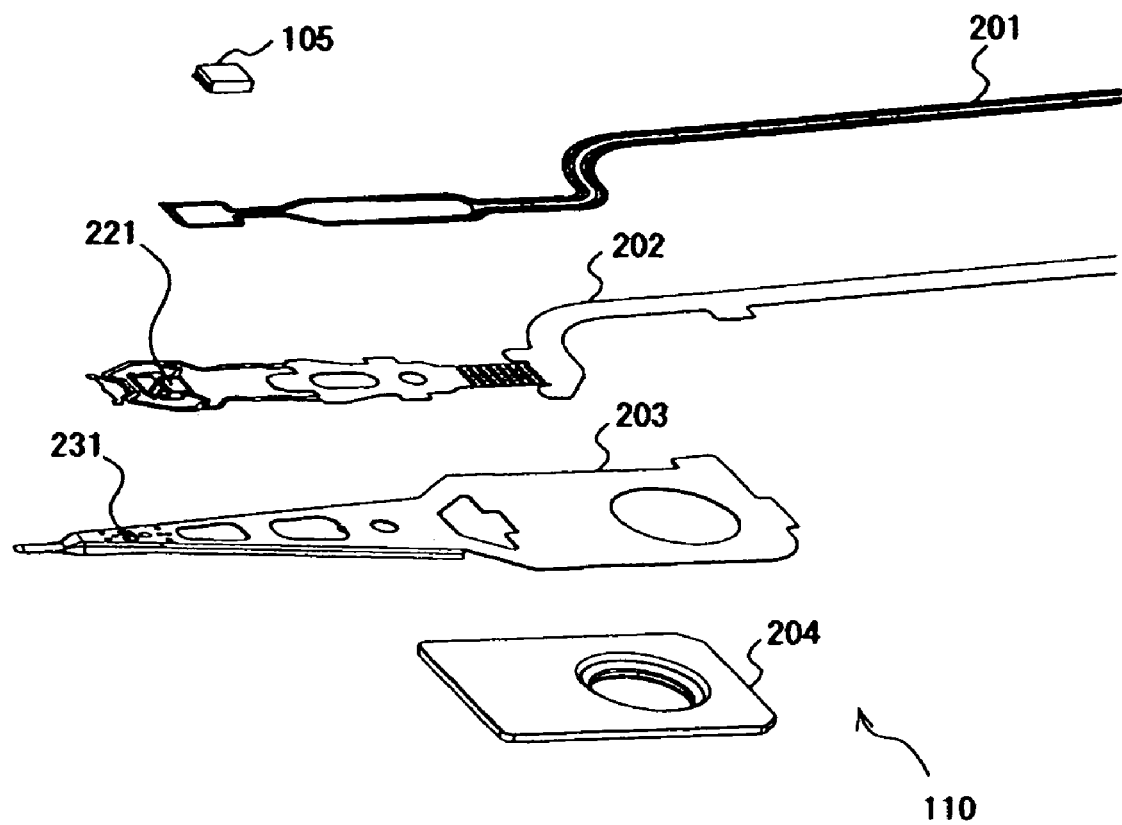
FIG. 3 is an exploded perspective view depicting an entire configuration of an HGA in one embodiment.

Now referring to FIG. 3, the configuration of an HGA 200 used in one embodiment will be described. FIG. 3 is an exploded perspective view depicting the HGA 200. The HGA 200 comprises a head slider 105, a suspension 110, and a trace 201. The suspension 110 comprises a gimbal 202 (also referred to as a flexure), a load beam 203, and a base plate 204. The trace 201 transmits signals of the elements on the head slider 105. The number of leads in the trace 201 can vary depending on the configuration of the head slider 105. An end of each lead is connected to internal circuits, a head amplifier, for example, and the other end of each lead is connected to one of the connection terminals formed on the gimbal 202.

The load beam 203 is made of stainless steel, for example, and functions as a fine leaf spring. The load beam 203 has a shape extending lengthwise in the direction orthogonal to the pivot direction, a thin shape, a light weight, and necessary rigidity (greater than the gimbal 202). The elasticity of the load beam 203 causes a load counteracting the flying force of the slider 105. Balancing this load with the pressure (flying force) caused by the air viscosity between the air bearing surface (ABS) of the head slider 105 and the spinning magnetic disk 101 allows the head slider 105 to fly at a desired fly-height.

The gimbal 202 is welded to the surface facing the magnetic disk 101 of the load beam 203 by laser spot welding. Or it may be fixed by swaging. The gimbal 202 is made of stainless steel, for example. The gimbal 202 has an intended elasticity and is formed deformably. In the front part of the gimbal 202, a tongue-like shaped gimbal tongue 221 is formed. The gimbal tongue 221 is a mounting plate on which the head slider 105 is mounted and the head slider 105 is bonded on the gimbal tongue 221. The gimbal tongue 221 is single-point supported by a projecting dimple 231 of the load beam 203. The gimbal tongue 221 can tilt the head slider 105 in a pitch or a roll direction to exhibit excellent following capability in tracking on the magnetic disk 101.

Figure 4:
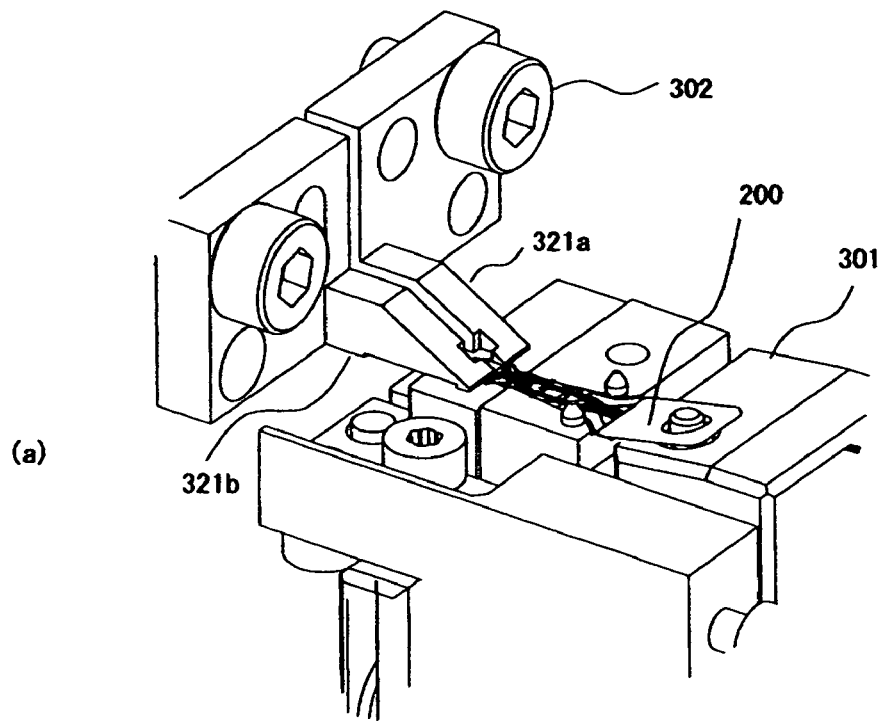
FIGS. 4(a) and 4(b) are drawings depicting an apparatus for detaching a head slider from an HGA in one embodiment.
Figure 4:
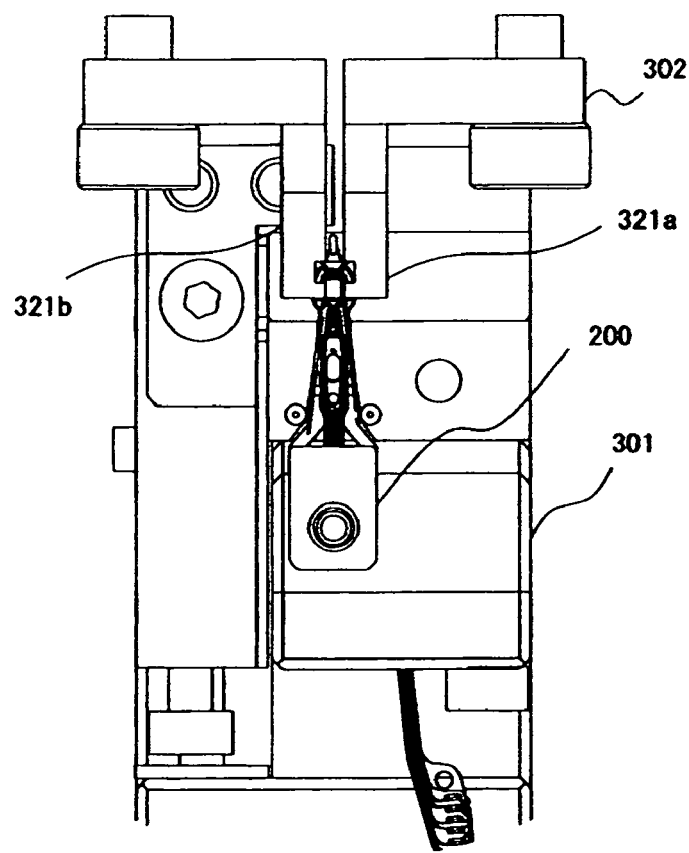

As described referring to FIG. 2, the manufacturing method of the HDD 100 of the present embodiment detaches a head slider 105 determined to be an error by the DET from a suspension 110 (S14). FIG. 4(a) is a perspective view depicting a part of the configuration of an apparatus for detaching a head slider 105 from a suspension 110. FIG. 4(b) is a top view of the configuration. An HGA 200 is fixed to a fixture 301 of a platform. The HGA 200 is fixed to the fixture 301 so that the ABS faces up (the opposite side from the fixture 301). Typically, the HGA 200 is fixed to the fixture 301 by sucking the HGA 200 toward the fixture 301.

A clamp device 302 pinches the head slider 105 at the both sides thereof to detach it from the suspension 110. The clamp device 302 has two arms 321a and 321b, which touch and press the both right and left sides, namely the two surfaces vertical to the pivot direction of the head slider 105 to pinch the head slider 105.

The clamp device 302 can move in the parallel and the vertical directions to the HGA mounting surface of the fixture 301. The clamp device 302 can move in front, back, right, and left directions in the in-plane direction of the ABS of the head slider 105, and can move in up and down direction in the vertical direction to the ABS.

Typically, a head slider 105 is bonded onto the mounting surface of a gimbal tongue 221 with adhesive. Besides, connection terminals for signal transmission on the head slider 105 and connection terminals for signal transmission on the gimbal 202 are interconnected by solder, gold, or the like. The head slider 105 may be fixed to the mounting surface of the gimbal tongue 221 by solder. The bonding between connection terminals for signal transmission and bonding force by adhesive can be diminished by heat. Applying a temperature higher than the melting point of solder releases solder joints; and the bonding force of the adhesive is considerably diminished at a higher temperature than a specific temperature. Detaching the head slider 105, after the bonding force between the head slider 105 and the suspension at the joint section has been diminished by heat, tears off the head slider 105 from the suspension 110 using the clamp device 302.

It is necessary not to deform the gimbal 202 in detaching the head slider 105. The gimbal 202 is formed of a deformable thin plate with small rigidity for its function. If the gimbal 202 is deformed, the suspension 110 cannot be reused. Therefore, a mechanism is necessary that prevents deformation of the gimbal 202 in tearing off the head slider 105.

Figure 5:
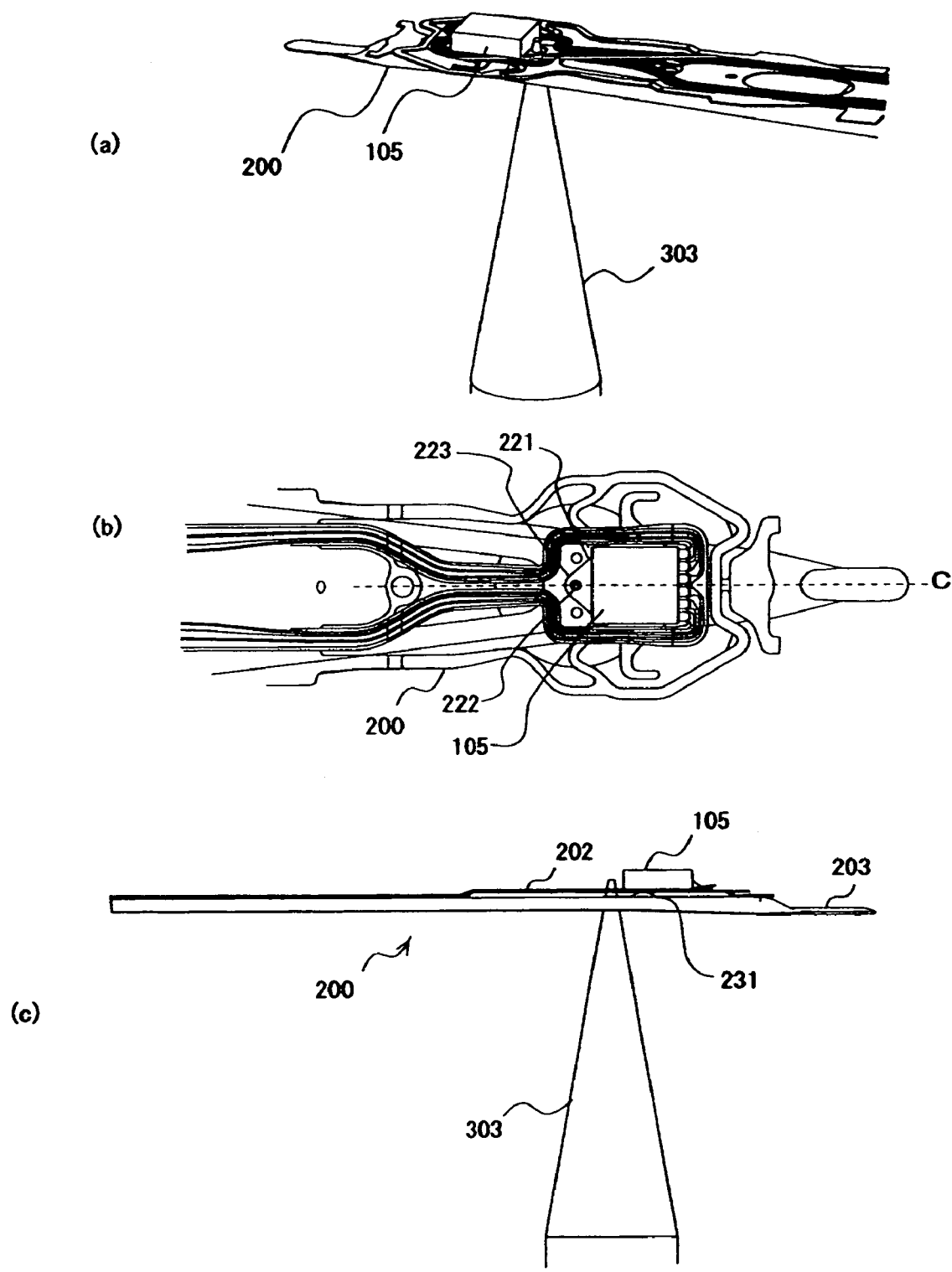
FIGS. 5(a)-5(c) are drawings depicting an HGA latched by a pin in detaching a head slider according to one embodiment.

In manufacturing the HGA 200 of the present embodiment, the gimbal tongue 221 is latched to prevent deformation of the gimbal 202 in detaching the head slider 105. FIGS. 5(a) to 5(c) illustrate a method for latching the gimbal tongue 221. In this example, the HGA 200 is latched by a pin 303. FIGS. 5(a) to 5(c) are a perspective view, a top view, and a side view respectively showing the HGA 200 penetrated by the pin 303. The gimbal tongue 221 has a through-hole 222 formed thereon and the tip end of the pin 303 penetrates the through-hole 222. The outer circumferential surface of the pin 303 touches the inner circumference of a through-hole 222 for the pin 303 to latch the gimbal tongue 221 (gimbal 202). The pin 303 functions as a stopper for stopping the movement of the gimbal tongue 221.

Figure 6:
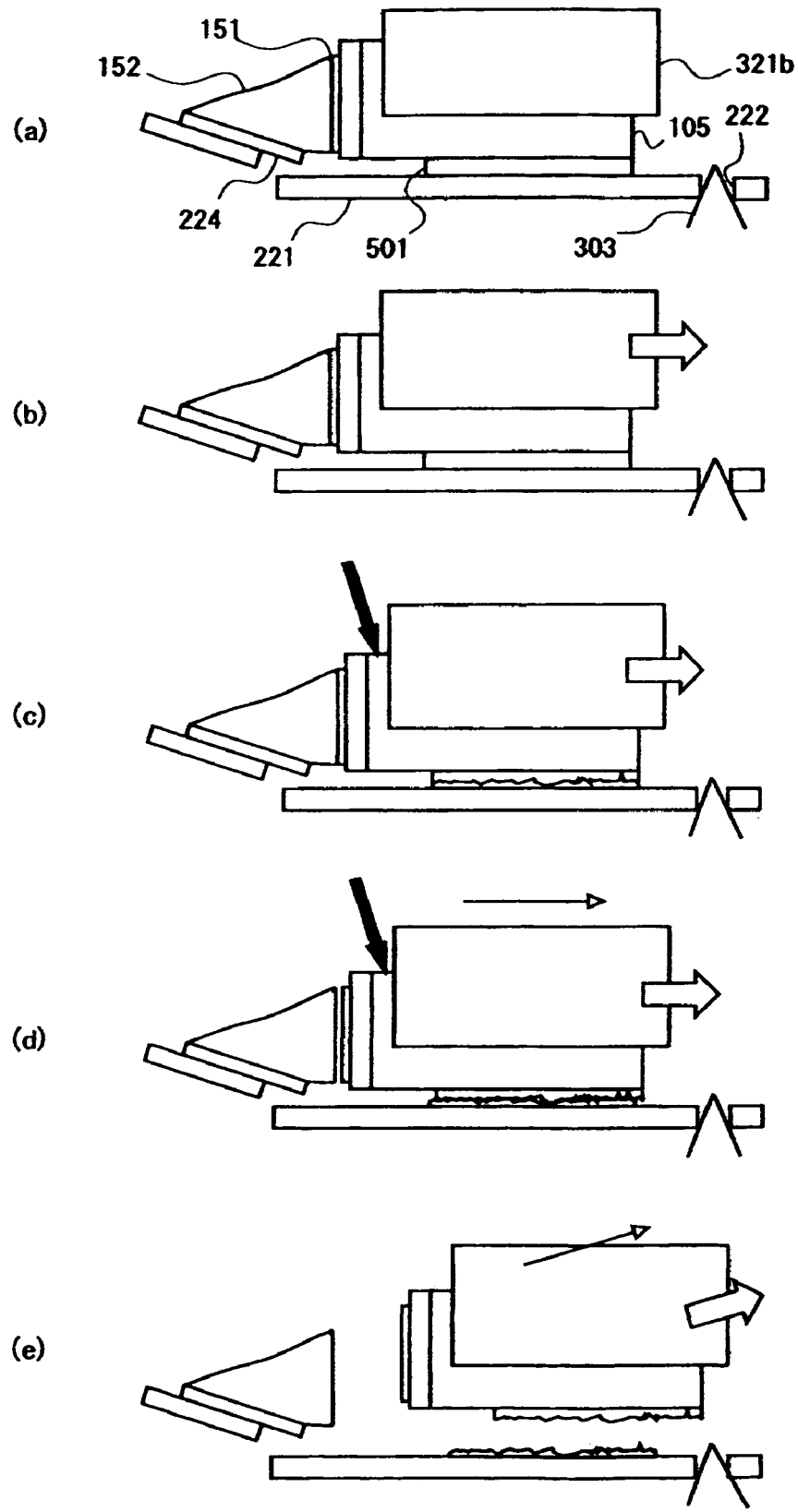
FIGS. 6(a)-6(e) are drawings illustrating a method for detaching a head slider from a suspension in one embodiment.

Now referring to FIGS. 6(a) to 6(e), a method for detaching a head slider 105 with the clamp device 302 will be described. As shown in FIG. 6(a), an adhesive layer 501 is provided between the reverse side from the ABS of the slider and the gimbal tongue 221 and securely bonds the head slider 105 to the gimbal tongue 221. The adhesive layer 501 is typically made of epoxy resin. Besides, a connection terminal 151 for signals of the head slider 105 and a connection terminal 224 for signals of the suspension 110 are joined by solder 152. The through-hole 222 on the gimbal tongue 221 is penetrated by the pin 303 from the surface facing the load beam, namely the opposite surface from the head slider 105.

As shown in FIG. 6(b), the clamp device 302 pinches the head slider 105 with arms 302a and 302b and applies force toward the flow-in end (leading side). The arms 302a and 302b are preliminarily heated to a specific temperature. The heat in the arms 203a and 302b does not substantially diminish the bonding force between the head slider 105 and the suspension 110. The preliminarily heated arms 302a and 302b prevents escape of heat in a subsequent heating process of the head slider 105.

In FIG. 6(b), the adhesive layer 501 and the solder 152 have strong bonding force so that their joint section is not broken by the force of the clamp device 302. The direction in which the clamp devise 302 applies force to the head slider 105 is horizontal to the head slider mounting surface of the gimbal tongue 221 and from the flow-out end (trailing side) toward the flow-in end (the direction from the left toward the right in FIG. 6(b)). Since no component of the force vertical to the head slider mounting surface exists, deformation of the gimbal 202 is prevented. Besides, the pin 303 penetrating the through-hole 222 of the gimbal tongue 221 latches the gimbal tongue 221 to prevent the force of the clamp device 302 from deforming the gimbal tongue 221. The amount of force at this time is set so as not to break the joint section of the head slider 105 or for the gimbal tongue 221 not to buckle.

Next, as shown in FIG. 6(c), a laser beam is irradiated to the head slider 105 from a laser device (not shown) while the clamp device 302 is applying force to the head slider 105. The laser beam heats the head slider 105 and the joint sections between the head slider 105 and the suspension 110. In the present example, it raises the temperature of the adhesive layer 501 and the solder 152. The solder 152 melts and the bonding force of the adhesive layer 501 significantly diminishes with rise in the temperature. Since the pin 303 is inserted from the side opposite from the head slider 105, it does not interrupt the laser irradiation.

The bonding force of the head slider 105 to the suspension 110 is diminished due to the heating and the head slider 105 is receiving force from the clamp device 302. Consequently, the head slider 105 moves in parallel toward its flow-in end as shown in FIG. 6(d). The movement of the head slider 105 causes the joint sections with the solder 152 and the adhesive layer 501 to lose their substantial bonding force.

When the head slider 105 moves, horizontal force is applied to the gimbal tongue 221, but the pin 303 latches the gimbal tongue 221 to prevent deformation of the gimbal 202. Laser heating with applying force to the head slider 105 can surely release the joining between the head slider 105 and the suspension 110 even in a short laser heating time.

Then, the laser device stops the laser beam irradiation. Moreover, as shown in FIG. 6(e), the clamp device 302 moves obliquely upward with holding the head slider 105, and then moves upward. In moving obliquely upward, the moving direction of the head slider 105 has a component parallel to the principal surface of the gimbal tongue 221 and toward the flow-in end and a component vertical to the principal surface of the gimbal tongue 221 and away from the gimbal tongue 221. The head slider 105 is completely detached from the suspension 110. In this way, such two steps of parallel movement of the head slider 105 (movement parallel to the slider mounting surface) leads to more assured release of the joining between the head slider 105 and the gimbal tongue 221 and prevention of deformation of the gimbal 202 due to the detachment of the head slider 105.

In detaching the head slider 105, the position latched by the pin 303 is important. In order to prevent deformation of the gimbal tongue 221 or other parts of the gimbal 202, the pin 303 is positioned preferably as close as possible to the head slider 105. On the other hand, in detaching the head slider, it is important for the head slider 105 not to touch the pin 303. If the head slider 105 touches the pin 303, the tip end of the pin 303 is chipped so that a replacement of the pin 303 becomes necessary. The replacement of the pin 303 requires much time and decreases the throughput of manufacturing the HGA 200.

In FIGS. 5(a) to 5(c), the through-hole 222 of the gimbal tongue 221 for the pin 303 is provided at the flow-in end side of the head slider 105 in the protrusion part 223. As shown in FIGS. 6(a) to 6(e), the head slider 105 is moved lengthwise (in the longitudinal direction) of the suspension 110 toward the flow-in end. It is important to design the distance between the flow-in end surface of the head slider 105 and the through-hole 222 so that the pin 303 will not touch the head slider 105.

In the present example, it is necessary that the distance (minimum distance) between the flow-in end surface of the head slider 105 and the end of the through-hole 222 be larger than the distance by which the head slider 105 moves in the horizontal direction toward the pin 303 as shown in FIG. 6(d). In addition, it is preferable that it be larger than the distance by which the head slider 105 moves two times in the horizontal direction toward the pin 303 as shown in FIGS. 6(d) and 6(e). Under such conditions, the flow-in end surface of the head slider 105 will never reach the pin 303. The difference between the distance between the flow-in end surface of the head slider 105 and the through-hole 222 and the moving distance should preferably be determined in consideration of tolerances in fixing head sliders 105 to gimbal tongues 221 or manufacturing tolerances of HGAs 200.

Besides, it is important to consider the trajectory of the head slider 105 in detaching the head slider 105 and the protruding amount of the tip end of the pin 303 from the through-hole 222. In the movement described in reference to FIG. 6(e), the head slider 105 moves upwardly, too. Therefore, if the reverse side from the ABS of the head slider 105 has been positioned above the tip end of the pin 303 before the flow-in end surface of the head slider 105 reaches the pin 303, the pin 303 can avoid the touch with the head slider 105.

Generally, connection terminals for signals of the head slider 105 are provided on the flow-out end surface so that the pin 303 is preferably located opposed to the other end surfaces of the head slider 105. Namely, it is preferable to latch the gimbal tongue 221 at the positions opposed to the flow-in end surface or the surfaces vertical to the pivot direction (transverse direction of the suspension 110).

It is important that the latching position of the pin 303 be on the center line of the head slider 105 or at points symmetric about the center line with respect to the moving direction of the head slider 105. In the relationship between the gimbal tongue 221 and the latching position, it is important that the latching position of the pin 303 be on the center line of the gimbal tongue 221 in the above-described moving direction, or points symmetric about the center line. If it is away from these points, the gimbal tongue 221 is likely to be deformed.

In the above example, the moving direction and the direction of the center line C (in FIG. 5(b)) in the lengthwise direction of the gimbal tongue 221 (the direction from the flow-in end toward the flow-out end) are the same. The through-hole 222 for the pin 303 is provided on the center line in the lengthwise direction of the gimbal tongue 221. The through-hole 222 can effectively prevent deformation of the gimbal 202 in detaching the head slider 105. In another example, a plurality of through-holes may be prepared at positions satisfying the above conditions on the gimbal tongue 221 and the gimbal tongue 221 may be latched by pins through the holes. However, from the view points of suppressing influence to the original suspension design and simplifying the structure of the device, it is preferable that the gimbal tongue 221 have only one through-hole on the center line. The single through-hole 222 close to the flow-in end can latch the gimbal tongue 221 in a sufficiently secure manner.

The initial condition of the pin 303 and the through-hole 222 before the clamp device 302 applies force to the head slider 105 is an important matter in detaching the head slider 105. As described above, in order to avoid contact between the head slider 105 and the pin 303, the moving distance of the clamp device 302 in the direction parallel to the ABS is set to as a small value as possible. In the initial condition, if there is a gap between the outer circumferential surface of the pin 303 and the inner edge of the through-hole 222, the moving distance of the head slider 105 becomes smaller than the designed value. This may cause a risk that the joining of the head slider 105 and the gimbal tongue 221 will not be sufficiently released.

Therefore, the outer circumferential surface of the pin 303 may touch the inner edge of the through-hole 222 from the beginning. In the present example, the side of the pin 303 is tapered to realize the touch at the initial state. That is, the diameter of the cross section of the pin 303 in the insert direction decreases toward its tip end. This enables the side of the pin 303 to surely touch the inner edge of the through-hole 222 with the pin 303 penetrating therethrough. The cross section of the pin 303 in the insert direction is preferably circular from the view point of machining accuracy.

Figure 7:
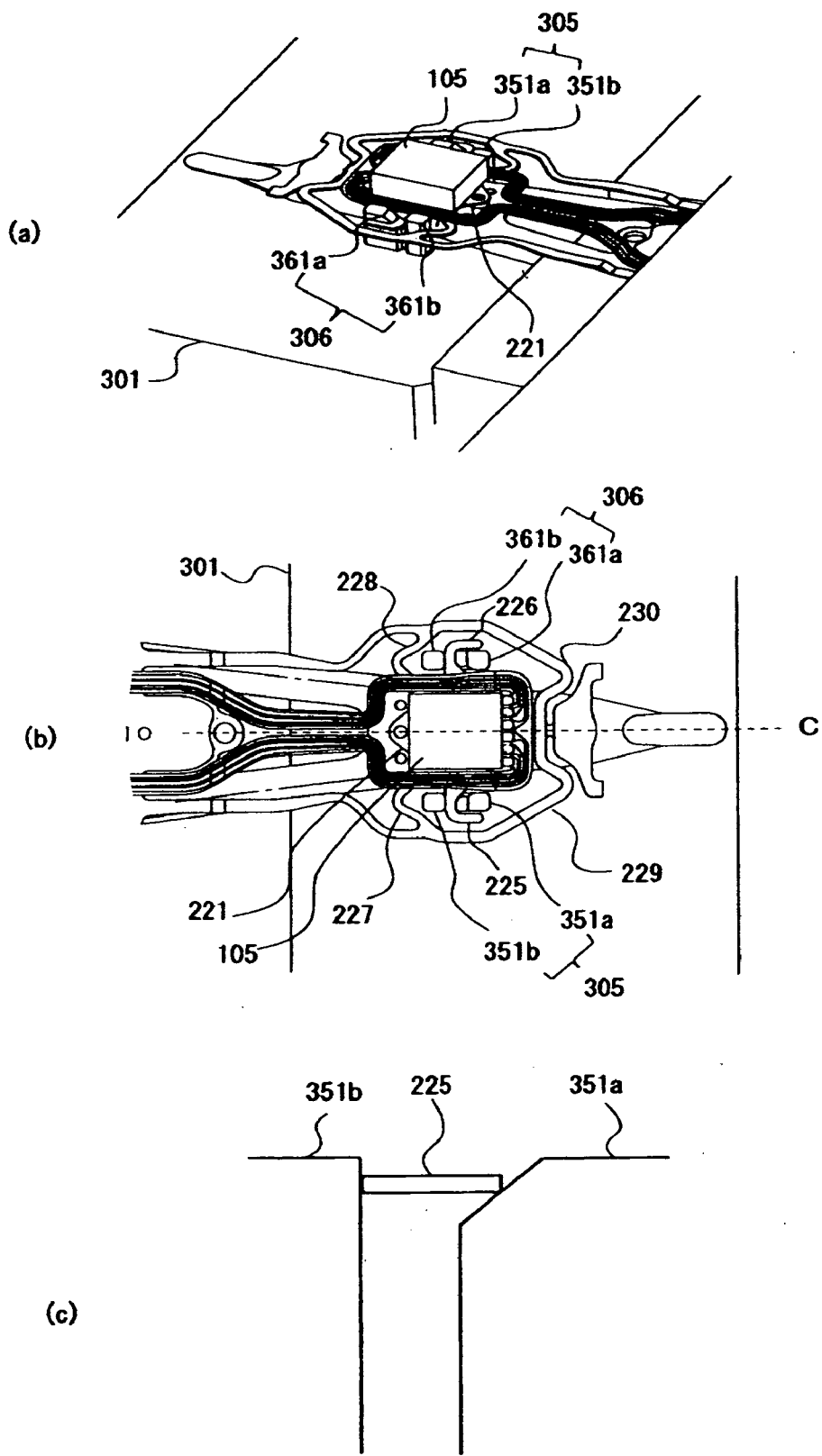
FIGS. 7(a)-7(c) are drawings depicting an HGA latched by pins in detaching a head slider according to one embodiment.

Now referring to FIGS. 7(a) to 7(c), another example for latching an HGA 200 will be described. FIGS. 7(a) to 7(c) depict an HGA 200 set to a fixture 301 with a head slider 105 not yet pinched by a clamp device 302. In FIGS. 7(a) to 7(c), the gimbal tongue 221 is latched at the both sides. The apparatus for detaching the head slider 105 is equipped with pins 305 and 306 instead of the pin 303. The pin 305 is constituted by two arms 351a and 351b and the pin 306 is constituted by two arms 361a and 361b. The pins 305 and 306 are inserted from the opposite side from the head slider 105 and pierce through the HGA 200. The gimbal tongue 221 has projecting parts 225 and 226 which are latched by the pins 305 and 306, respectively.

As shown in FIG. 7(b), the gimbal tongue 221 is joined to the right and left arms 229 and 230 extending in the longitudinal direction of the gimbal 202 with links 227 and 228 extending in the pivot direction. The projecting parts 225 and 226 extend in the pivot direction from the mounting surface of the head slider 105 and then bend turn toward the front (the flow-out end). The projecting parts 225 and 226 are not joined to the arms 229 and 230. In the lengthwise direction (the longitudinal direction) of the suspension 110, the projecting parts 225 and 226 are located between the flow-in end surface and the flow-out end surface of the head slider 105.

In the present example, as similar to the other example described above, the clamp device 302 moves the head slider 105 toward the flow-in end to detach it. The moving direction toward the flow-in end is parallel to the center line of the gimbal tongue 221 in its lengthwise direction (the left-right direction in FIG. 7(b)). As shown in FIG. 7(b), the projecting parts 225 and 226 are located at positions symmetric about the above center line C. This prevents deformation of the gimbal tongue 221.

When the gimbal tongue 221 is latched at positions symmetric about the center line instead of on the center line, the gimbal tongue 221 is latched at the even number of positions having corresponding symmetric points to each other. However, in order to avoid the structures of the device and the HGA 200 from becoming complicated, it is preferable that the gimbal tongue 221 be latched at two positions symmetric about the center line. Since the pins 305 and 306 are provided at the positions sandwiching the head slider 105 to be moved, they will never touch the head slider 105 in detaching the head slider 105.

As similar to the other example, it is important that the projecting parts 225 and 226 touch the pins 305 and 306 before receiving force from the clamp device 302. The front arms 351a of the pins 305 and 361a of the pin 306 have tapered surfaces. The tapered surfaces are formed so that the arms 351a and 361a have smaller diameters toward the tip ends thereof. Therefore, when the HGA 200 is set, the projecting parts 225 and 226 can surely touch the arms (351a, 361a) and the rear arms (351b, 361b), respectively, as shown in FIG. 7(c). Note that the rear arm may be tapered, or the opposed surfaces of both of the arms may be tapered.

As set forth above, the present invention has been described by way of example of particular embodiments, but is not limited to the above embodiments. A person skilled in the art can modify, add, or convert the components in the above embodiments within the scope of the present invention. For example, embodiments of the preset invention are applicable to a HGA having a microactuator. A microactuator bonded on a gimbal tongue has been known. A head slider is supported by the microactuator. In such a type of HGA, embodiments of the preset invention can be utilized in detaching a head slider and/or a microactuator.

The method for heating a joint section in detaching a head slider is not limited to the above examples. A thermal source other than laser beam can be used or the actual heating position is not particularly limited as long as the joint section is heated. The joint section to be released in the detaching the head slider is not limited to the joint section for directly joining the head slider and the gimbal. The joint section between the head slider and the suspension can be the joint section between the microactuator and the head slider in such an above-described HGA having a microactuator.

What is claimed is:

1. An apparatus for detaching a head slider bonded onto a mounting plate of a suspension comprising:
    a platform on which a head gimbal assembly is mounted;
    a heating device for heating, a joint section between the head slider and the suspension to decrease the bonding force;
    a latching part for latching the mounting plate at a position on a center line of the mounting plate in the lengthwise direction and/or at positions symmetric about the center line;
    and a clamp device for moving the head slider in a direction along the center line with the heating to detach the head slider from the mounting plate,
    the latching part has a pin inserted into a through-hole formed on an opposite side of the mounting plate from an end surface of the slider to latch the mounting plate,
    wherein the clamp device is adapted for moving the head slider in a direction toward the pin to detach the head slider from the mounting plate.

2. The apparatus according to claim 1, wherein
    the head slider moves in the direction along the center line by virtue of the decreased bonding force at the joint section by the heating; and
    the clamp device moves the head slider further in the direction along the center line to detach the head slider from the mounting plate after the heating.

3. The apparatus according to claim 1, wherein the clamp device starts to move the head slider along the center line with the latching part latching the mounting plate.

4. An apparatus for detaching a head slider bonded onto a mounting plate of a suspension comprising:
    a platform on which a head gimbal assembly is mounted;
    a heating device for heating a joint section between the head slider and the suspension to decrease the bonding force;
    a latching part for latching the mounting plate at a position on a center line of the mounting plate in the lengthwise direction and/or at positions symmetric about the center line;
    and a clamp device for moving the head slider in a direction along the center line with the heating to detach the head slider from the mounting plate,
    wherein the head slider has an end surface on which connection terminals for signals are provided;
    the latching part has a pin inserted into a through-hole formed on an opposite side of the mounting plate from the end surface to latch the mounting plate;
    the clamp device moves the head slider in a direction toward the pin to detach the head slider from the mounting plate; and
    the head slider is detached from the mounting plate without touching the pin by virtue of the distance between the pin and the opposite surface from the end surface.

5. The apparatus according to claim 4, wherein the latching part latches the mounting plate only by the pin inserted into the through-hole formed on the center line of the mounting plate.

6. The apparatus according to claim 4, wherein
    an outer circumferential surface of the pin is a tapered surface; and
    the clamp device starts to move the head slider with the outer circumferential surface touching an inner circumference of the through-hole.

7. The apparatus according to claim 4, wherein
the head slider moves in the direction along the center line by virtue of the decreased bonding force at the joint section by the heating; and
the clamp device moves the head slider further in the direction along the center line to detach the head slider from the mounting plate after the heating.

8. The apparatus according to claim 4, wherein
the clamp device starts to move the head slider along the center line with the latching part latching the mounting plate.

* * * * *